United States Patent [19]

Nieuwenhuis

[11] 3,791,520

[45] Feb. 12, 1974

[54] PROCESS FOR TREATING WATER CONTAMINATED WITH HEXAVALENT CHROMIUM

[76] Inventor: Garmt J. Nieuwenhuis, 3601 197th Place S.E., Issaquah, Wash. 98027

[22] Filed: Feb. 17, 1972

[21] Appl. No.: 227,099

[52] U.S. Cl.............. 210/36, 75/101 BE, 75/120, 210/38, 210/42, 210/283, 210/502, 423/55
[51] Int. Cl............................................. C02b 1/16
[58] Field of Search.... 75/101 BE, 120; 210/36, 38, 210/42, 50, 59, 502, 506; 423/55, 92, 98

[56] References Cited
UNITED STATES PATENTS
| | | | |
|---|---|---|---|
| 3,470,104 | 9/1969 | Domas | 210/36 X |
| 3,493,328 | 2/1970 | Nieuwenhuis | 210/42 X |
| 3,479,376 | 11/1969 | Buzby, Jr. et al. | 75/101 BE |
| 2,733,204 | 11/1956 | Costa | 75/101 BE |

Primary Examiner—Samih N. Zaharna
Assistant Examiner—Robert H. Spitzer
Attorney, Agent, or Firm—Richard W. Seed et al.

[57] ABSTRACT

Water containing chromium anions in the parts per million range are removed by contacting the water-laden chromium solution with a water insoluble lead compound, such as lead oxide, lead carbonate or lead hydroxide, adsorbed in the pores of an essentially inert, porous, particulate matrix such as vermiculite. The lead compound reacts with the chromium in the water to form insoluble lead chromate. The effluent may be passed through an ion exchange column containing an acidic cation exchanger in the hydrogen form for removing any lead ion solubilized during passage through the bed of adsorbed lead compound.

9 Claims, 1 Drawing Figure

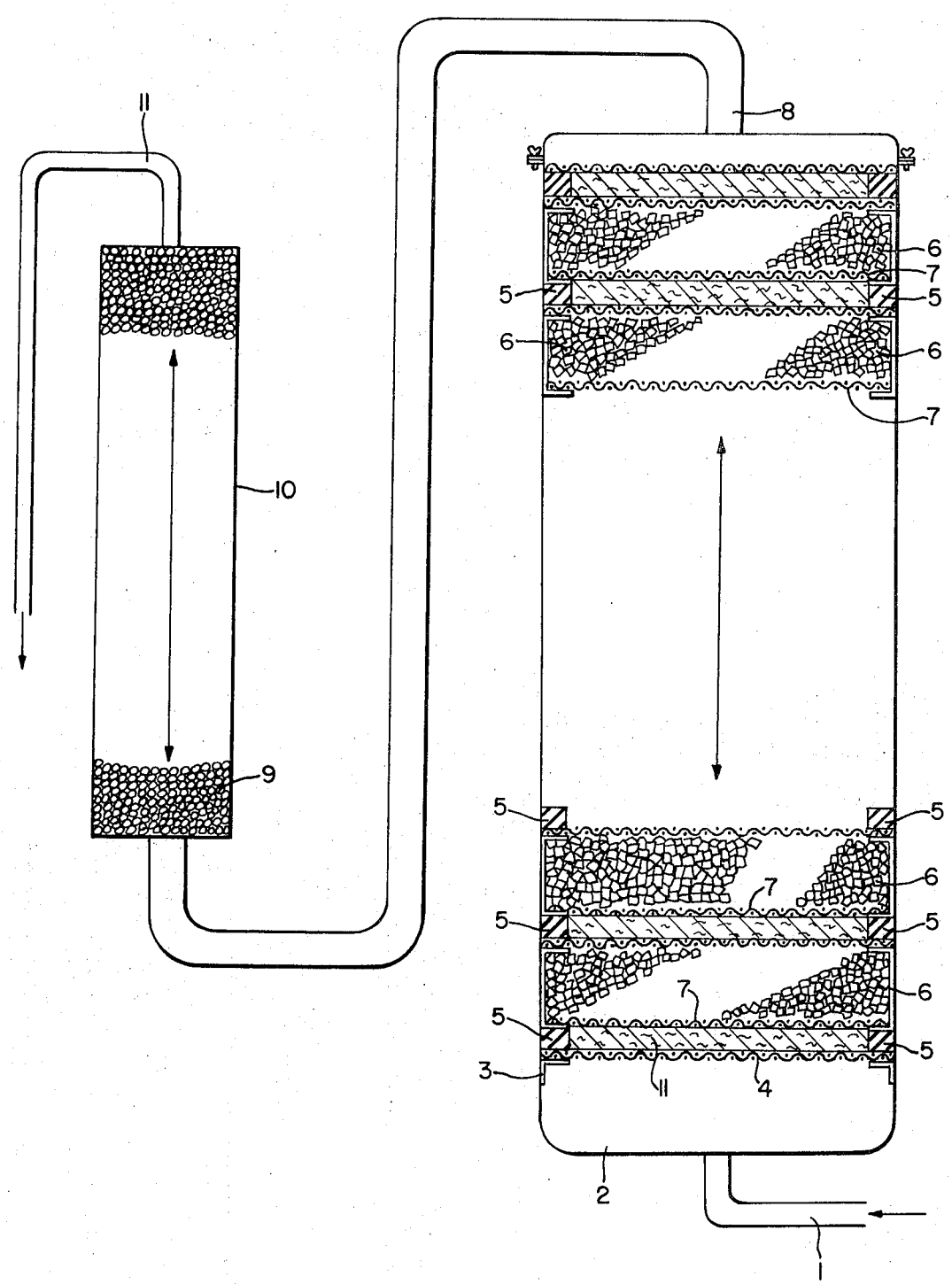

PROCESS FOR TREATING WATER CONTAMINATED WITH HEXAVALENT CHROMIUM

BACKGROUND OF THE INVENTION

1. Field Of the Invention

This invention relates to a process for removing chromium anions present in small quantities from waste waters.

2. Prior Art Relating to the Disclosure

Chromium-containing solutions are widely used in a number of industries to treat metals. Disposal of the spent solutions is an acute problem, as minute concentrations of chromium are toxic to fish and other aquatic life. Thus, before any water can be discharged into a water body or sewer system, the chromium must be substantially completely removed from the water. Removal of chromium from rinse waters by ion exchange methods is well known but is less than satisfactory because (1) of the cost, (2) the life of the ion exchange resin is short and can only be regenerated a few times before replacement, and (3) regeneration of the ion exchange resin yields a concentrated chromium solution which still presents a disposal problem.

The recovery of hexavalent chromium from aqueous metal treating baths is disclosed in U.S. Pat. No. 3,493,328. The process disclosed includes metering stoichiometric amounts of a lead compound such as lead nitrate into a treating bath containing the chromium to form an insoluble lead chromate.

Utilizing the fact that chromium can be effectively removed by precipitation with a lead compound to form insoluble lead chromate, water containing a few parts per million hexavalent chromium was run through a bed containing a particulate insoluble lead compound such as lead oxide or hydroxide. Flow through the bed was very slow due to the formation of insoluble lead chromate which tended to cause packing of the bed. Channeling of the bed also occurred with upward flow of water therethrough with the result the chromium in the water was not adequately removed.

SUMMARY OF THE INVENTION

This invention relates to a method of removing chromium anion from water solutions containing very small amounts thereof by contacting the chromium-laden water with a relatively water insoluble lead compound in conjunction with a porous, particulate matrix which prevents packing and channeling of the insoluble lead compound. The effluent from which the chromium has been removed may then be run through a cation exchanger in the hydrogen form to remove any solubilized lead ion.

BRIEF DESCRIPTION OF THE DRAWING

The drawing illustrates a flow diagram and apparatus for carrying out the process described herein.

DESCRIPTION OF THE PREFERRED EMBODIMENTS

Metal plating solution waste waters containing hexavalent chromium or rinse waters in the plating industry containing chromium anion in the parts per million range are treated as shown in the drawing by passing the waste water, either on a continuous or batch basis, upwardly through a vessel containing one or more trays holding a substantially water insoluble lead compound in conjunction with a particulate carrier matrix which prevents channeling and packing of the bed, the lead compound being one capable of reacting with the chromium in the waste water to form insoluble lead chromate. Waste water entering the lower end of the vessel through line 1 flows upwardly through a plurality of trays 6 held therein, each of the trays having a screened or foraminous bottom wall 7 with a mesh size small enough to prevent the carrier and the lead compound held therein from passing therethrough. Each of the trays is separated by a ring 5 of any suitable material such as sponge rubber, urthane foam, etc. The lower of the trays rests on a separator ring 5 which, in turn, rests on bracket 3 secured around the inner wall of the vessel shell 2. The number and size of the trays depends on the volume throughput of waste water, the amount of chromium in the water to be removed, and other factors. A perforated or foraminous plate 4 rests on the bracket 3 and a filter material 11 is supported about the last tray and, if desired, below the first of the trays. The filter material may be a loose cotton fiber filter or other suitable filter material for retaining lead chromate particles. The trays in vessel 2 can be removed through the top of the vessel and the particulate lead compound therein replaced when substantially all of the lead has been converted to insoluble lead chromate. The lead chromate is easily removed from the carrier material and, since lead chromate is a well known pigment in the paint industry, there is no disposal problem associated therewith.

The particulate reactive lead compound held by the essentially inert matrix or carrier should be one which is essentially insoluble in the water solution. Lead compounds such as lead oxide, lead carbonate, or lead hydroxide are exemplary of those which may be used.

The carrier material should be capable of preventing channeling and packing of the particulate lead compound held in the trays. The preferred carrier is vermiculite having a particle size ranging from one-sixteenth inch to one thirty-second inch. Diatomaceous earth and pumice have been tried as carrier materials but did not perform satisfactorily. The lead compound appears to be adsorbed in the pores of the vermiculite and cannot be washed out.

The weight ratio of lead compound to carrier material may range from 1:1 to 1:4 and preferably 1:2. Best results were obtained using one gram lead carbonate to 9.93 grams ground vermiculite made by the Zonolite Company, the vermiculite having a particle size ranging from one-sixteenth inch to one thirty-second inch. In this proportion the lead carbonate/vermiculite has a specific gravity of about 1.0 and provides an uninterrupted flow of water solution with no back pressure.

The effluent leaving the vessel 2 through line 8 contains a very small amount of lead ion because of the slight solubility of the insoluble lead compound in water. This minute quantity of residual lead may be removed by running the effluent through an ion exchange column 9 containing a cation exchange resin 10 such as Dowex 50-W in the hydrogen form. Other ion exchange media capable of reversibly exchanging lead ion can be employed. The ion exchange resin in columns 9 has a long life and need not be replaced as it is not broken down by chromium anions. When the ion exchange capacity of the column has been depleted the column may be regenerated by known means.

When the system described is used to process waste waters containing only a few parts per million of hexavalent chromium anions, and a relatively small size of combined lead/vermiculite bed and cation ion exchanger are used, there is a need to regenerate the column and beds only once every three to six months. This is significantly less than that required for regeneration utilizing ion exchange resins alone to remove chromium.

I claim:

1. The process of removing chromium anions from aqueous solutions containing small quantities of chromium comprising:

providing a water insoluble particulate medium consisting essentially of a particulate carrier having a water insoluble lead compound selected from the group consisting of lead oxide, lead carbonate, and lead hydroxide adsorbed thereon, the carrier being inert with respect to the chromium anions in the aqueous solution and the lead compound, contacting the chromium-laden water with the particulate medium, the chromium in the water reacting with the adsorbed lead compound to form water insoluble lead chromate, and recovering the effluent with the chromium anions removed.

2. The process of claim 1 wherein the inert particulate carrier material is vermiculite.

3. The process of claim 2 wherein the weight ratio of lead compound to vermiculite ranges from 1:1 to 1:4.

4. The process of claim 2 wherein the vermiculite has a particle size ranging from one-sixteenth inch to one thirty-second inch and a weight ratio of lead compound to vermiculite such that the combination has a specific gravity of about 1.0.

5. The process of claim 1 including passing the effluent through an acidic cation exchanger for removal of lead ion solubilized during passage of the aqueous solution through the particulate lead compound.

6. A process for removing hexavalent chromium from aqueous solutions containing small quantities thereof, comprising:

providing a vessel having a plurality of open top, vertically stacked trays therein, each tray having a foraminous bottom wall containing a particulate medium consisting essentially of a water insoluble lead compound selected from the group consisting of lead oxide, lead carbonate, and lead hydroxide adsorbed in the pores of an particulate carrier material inert with respect to the lead compound and chromium in the water, passing water containing the chromium ions upwardly through the trays, the chromium in the water reacting with the lead compound to form insoluble lead chromate, and recovering the effluent.

7. The process of claim 6 wherein the particulate carrier material is vermiculite.

8. The process of claim 7 wherein the vermiculite has a particle size ranging from one-sixteenth inch to one thirty-second inch and the weight ratio of lead compound to vermiculite is such that the combination has a specific gravity of about 1.0.

9. The process of claim 6 including passing the effluent through an acidic cation exchanger in the hydrogen form which removes the lead ion solubilized during passage through the lead compound.

* * * * *